(12) United States Patent
Martin et al.

(10) Patent No.: US 6,829,132 B2
(45) Date of Patent: Dec. 7, 2004

(54) CHARGE CONTROL OF MICRO-ELECTROMECHANICAL DEVICE

(75) Inventors: Eric T. Martin, Corvallis, OR (US);
Mark Hunter, Portland, OR (US);
Arthur Piehl, Corvallis, OR (US);
James R. Przybyla, Philomath, OR (US); Matthew Gelhaus, Albany, OR (US); Leslie Louis Szepesi, Jr., Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/428,168

(22) Filed: Apr. 30, 2003

(65) Prior Publication Data

US 2004/0218341 A1 Nov. 4, 2004

(51) Int. Cl.⁷ .................................................. H01G 5/01
(52) U.S. Cl. ........................ 361/278; 333/174; 333/185; 333/262; 361/115; 361/277
(58) Field of Search ....................... 333/174, 185, 333/262; 361/115, 277, 278, 282

(56) References Cited

U.S. PATENT DOCUMENTS

| | | | | |
|---|---|---|---|---|
| 6,088,214 A | * | 7/2000 | Malone et al. | 361/278 |
| 6,229,684 B1 | * | 5/2001 | Cowen et al. | 361/278 |
| 6,329,738 B1 | | 12/2001 | Hung et al. | |
| 6,339,493 B1 | | 1/2002 | Scalora et al. | |
| 6,355,534 B1 | * | 3/2002 | Cheng et al. | 438/379 |
| 6,373,682 B1 | | 4/2002 | Goodwin-Johansson | |
| 6,377,438 B1 | | 4/2002 | Deane et al. | |
| 6,404,304 B1 | | 6/2002 | Kwon et al. | |
| 6,418,006 B1 | | 7/2002 | Liu et al. | |
| 6,441,449 B1 | | 8/2002 | Xu et al. | |
| 6,496,348 B2 | * | 12/2002 | McIntosh | 361/115 |
| 6,496,351 B2 | * | 12/2002 | Hill et al. | 361/278 |
| 6,509,812 B2 | | 1/2003 | Sayyah | |
| 6,744,335 B2 | * | 6/2004 | Ryhanen et al. | 333/185 |

OTHER PUBLICATIONS

Hung, Elmer S. et al., "Extending the Travel Range of Analog-Tuned Electrostatic Actuators," Journal of Microelectromechanical Systems, vol. 8, No. 4, Dec. 1999.

* cited by examiner

*Primary Examiner*—David Nelms
*Assistant Examiner*—Dao H. Nguyen

(57) ABSTRACT

A charge control circuit for controlling a microelectromechanical system (MEMS) device having variable capacitor formed by first conductive plate and a second conductive plate separated by a variable gap distance. The charge control circuit comprises a switch circuit configured to receive a reference voltage having a selected voltage level and configured to respond to an enable signal having a duration at least as long as an electrical time constant constant of the MEMS device, but shorter than a mechanical time constant of the MEMS device, to apply the selected voltage level across the first and second plates for the duration to thereby cause a stored charge having a desired magnitude to accumulate on the variable capacitor, wherein the variable gap distance is a function of the magnitude of the stored charge.

6 Claims, 4 Drawing Sheets

CHARGE CONTROL OF MICRO-ELECTROMECHANICAL DEVICE

CROSS REFERENCE TO RELATED APPLICATIONS

This patent application is related to U.S. patent application Ser. No. 10/428,261 "unassigned" filed concurrently herewith and entitled "Optical Interference Display Device," which is herein incorporated by reference.

THE FIELD OF THE INVENTION

The present invention relates to the field of micro-electromechanical devices. More particularly, the present invention relates to charge control of a micro-electromechanical device.

BACKGROUND OF THE INVENTION

Micro-electromechanical systems (MEMS) are systems which are developed using thin film technology and which include both electrical and micro-mechanical components. MEMS devices are used in a variety of applications such as optical display systems, pressure sensors, flow sensors and charge control actuators. MEMS devices use electrostatic force or energy to move or monitor the movement of micro-mechanical electrodes which can store charge. In one type of MEMS device, to achieve a desired result, a gap distance between the electrodes is controlled by balancing an electrostatic force and a mechanical restoring force. Digital MEMS devices use two gap distances, while analog MEMS devices use multiple gap distances.

MEMS devices have been developed using a variety of approaches. In one approach, a deformable deflective membrane is positioned over an electrode and is electrostatically attracted to the electrode. Other approaches use flaps or beams of silicon or aluminum which form a top conducting layer. With optical applications, the conducting layer is reflective and is deformed using electrostatic force to scatter light which is incident upon the conducting layer.

One approach for controlling the gap distance is to apply a continuous control voltage to the electrodes, wherein the control voltage is increased to decrease the gap distance, and vice-versa. However, this approach suffers from electrostatic instability that greatly reduces a useable operating range over which the gap distance can be effectively controlled. This is because the electrodes form a variable capacitor whose capacitance increases as the gap distance decreases. When the gap distance is reduced to a certain threshold value, usually about two-thirds of an initial gap distance, the electrostatic force of attraction between the electrodes overcomes the mechanical restoring force causing the electrodes to "snap" together or to mechanical stops. This is because at a distance less than the minimum threshold value, the capacitance is increased to a point where excess charge is drawn onto the electrodes resulting in increased electrostatic attraction—a phenomenon known as "charge runaway."

This non-linear relationship between the control voltage and the gap distance limits the controllable range of electrode movement to only about one-third of the initial gap distance, and thus limits the potential utility of the MEMS device. For example, with optical display systems, interference or detraction based light modulator MEMS devices preferably should have a large range of gap distance control in order to control a greater optical range of visible light scattered by the optical MEMS device.

SUMMARY OF THE INVENTION

One aspect of the present invention provides a charge control circuit for controlling a micro-electromechanical system (MEMS) device having variable capacitor formed by a first conductive plate and a second conductive plate separated by a variable gap distance. The charge control circuit comprises a switch circuit configured to receive a reference voltage having a selected voltage level and configured to respond to an enable signal having a duration at least as long as an electrical time constant of the MEMS device, but shorter than a mechanical time constant of the MEMS device, to apply the selected voltage level across the first and second plates for the duration to thereby cause a stored charge having a desired magnitude to accumulate on the variable capacitor, wherein the variable gap distance is a function of the magnitude of the stored charge.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
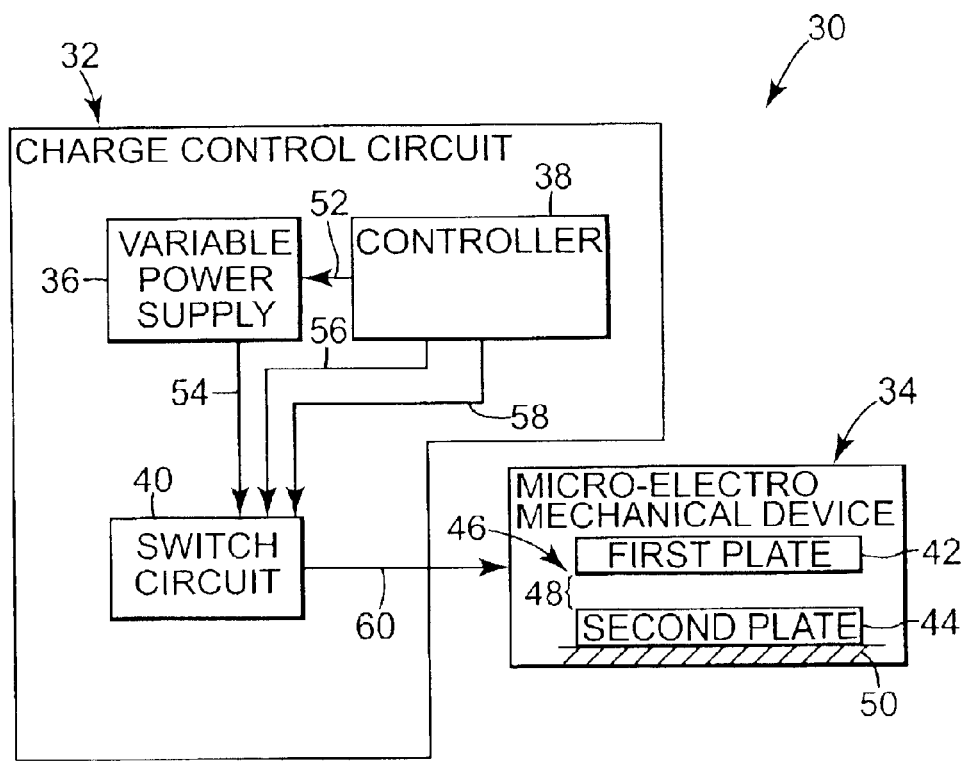
FIG. 1 is a diagram illustrating an exemplary embodiment of a micro-electromechanical system according to the present invention.

FIG. 1 is a diagram illustrating an exemplary embodiment of a micro-electromechanical system 30 according to the present invention. The micro-electromechanical system 30 includes a charge control circuit 32 and a micro-electromechanical device 34. Charge control circuit 32 further includes a variable power supply 36, a controller 38, and a switch circuit 40. In the exemplary embodiment, micro-electromechanical device 34 further includes a first conductive plate 42 and a second conductive plate 44 that form a variable capacitor 46 having a variable gap distance 48, wherein variable gap distance 48 is a function of a magnitude of a stored charge on variable capacitor 46. In one embodiment, first conductive plate 42 is moveable, while second conductive plate 44 is fixed to a substrate 50.

Charge control circuit 32 is configured to control micro-electromechanical device 34 by applying a reference voltage having a selected voltage level provided by variable power supply 36 across first and second conductive plates 42 and 44 for a predetermined duration to thereby cause a stored charge having a desired magnitude to accumulate on variable capacitor 46. By application of a precision reference voltage across first and second conductive plates 42 and 44, the charge stored on variable capacitor 46 and thus, variable gap 48, can be controlled over a wide gap distance range.

In the exemplary embodiment, variable power supply 36 is a variable voltage source configured to receive a voltage select signal from controller 38 via a path 52 and to provide the reference voltage having a selected voltage level based on the voltage select signal to switch circuit 40 via a path 54. Switch circuit 40 is configured to receive an enable signal having a duration from controller 38 via a path 56 and, in response, to apply for the duration the selected voltage level to micro-electromechanical device 34 via a path 60 to thereby cause a stored charge having a desired magnitude to accumulate on variable capacitor 46. In one embodiment, switch circuit 40 is configured to receive a clear signal from controller 38 via a path 58 and, in response, configured to remove a potential stored charge on variable capacitor 46 to thereby place variable capacitor 46 at a known charge level prior to applying the reference voltage having the selected voltage level.

Figure 2:
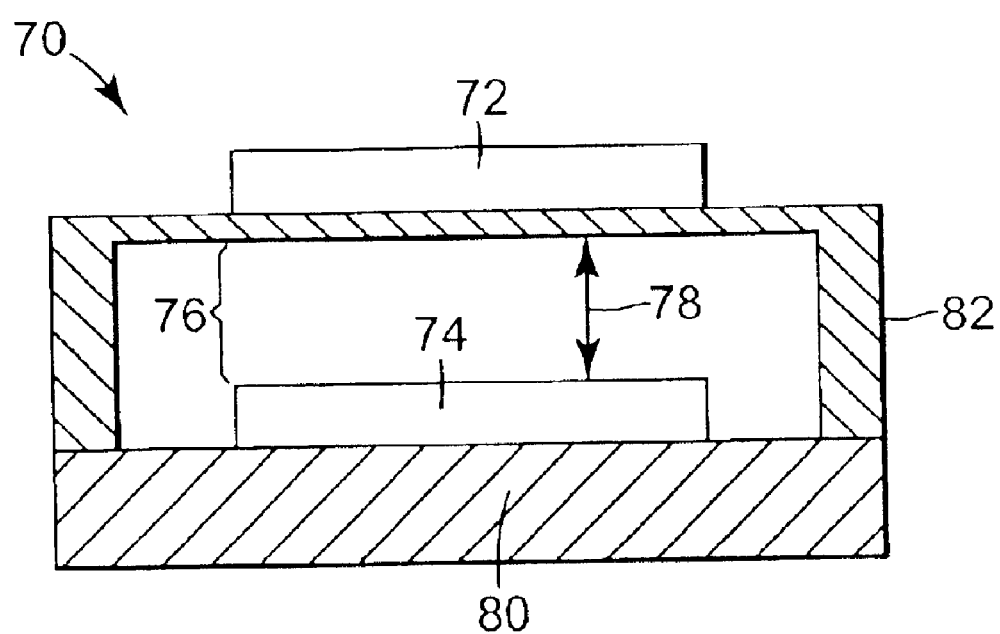
FIG. 2 is a diagram illustrating an exemplary embodiment of a micro-electromechanical device.

FIG. 2 is a diagram illustrating an exemplary embodiment of a micro-electromechanical device 70. In the exemplary embodiment, micro-electromechanical device 70 displays, at least partially, a pixel of a displayable image. The device 70 includes a top reflector 72 and a bottom reflector 74, as well as a flexure 80 and a spring mechanism 82. A resonant optical cavity 76 is defined by the reflectors 72 and 74, which has a variable gap distance, or gap distance, 78. The top reflector 72 is in one embodiment semi-transparent or semi-reflective. The bottom reflector 74 is in one embodiment highly reflective or completely reflective. In other embodiments, the top reflector 72 is highly reflective or completely reflective and the bottom reflector 74 is semi-transparent or semi-reflective. In various embodiments, spring mechanism 82 can be any suitable flexible material, such as a polymer, that has linear or non-linear spring functionality.

In the exemplary embodiment, the optical cavity 76 is variably selective of a visible wavelength at an intensity by optical interference. Depending on the desired configuration of micro-electromechanical device 70, the optical cavity 76 can either reflect or transmit the wavelength at the intensity. That is, the cavity 76 can be reflective or transmissive in nature. No light is generated by optical cavity 76, so that the device 70 relies on ambient light or light provided by micro-electromechanical device 70 that is reflected or transmitted by the cavity 76. The visible wavelength selected by the optical cavity 76, and its intensity selected by the optical cavity 76, are dependent on the gap distance 78 of the cavity 76. That is, the optical cavity 76 can be tuned to a desired wavelength at a desired intensity by controlling its gap distance 78.

In the exemplary embodiment, the flexure 80 and the spring mechanism 82 allow the gap distance 78 of the optical cavity 76 to vary when an appropriate amount of charge has been stored on the reflectors 72 and 74, such that a desired wavelength at a desired intensity is selected. This charge, and the corresponding voltage, is determined in accordance with the following Equation I, which is the force of attraction between the reflectors 72 and 74 acting as plates of a parallel plate capacitor, and does not take into account fringing fields:

$$F = \frac{\varepsilon_0 V^2 A}{2d^2},\qquad\text{Equation I}$$

where $\varepsilon_0$ is the permittivity of free space;

V is the voltage across the reflectors 72 and 74;

A is the area of each of the reflectors 72 and 74; and d is the gap distance 78.

Thus, a one volt potential across a 70 micron square pixel, with a gap distance 78 of 0.25 microns, yields an electrostatic force of $7\times10^{-7}$ Newtons (N).

Therefore, an amount of charge corresponding to a small voltage between the reflectors 72 and 74 provides sufficient force to move the top reflector 72, and hold it against gravity and shocks. The electrostatic charge stored in the reflectors 72 and 74, is sufficient to hold the top reflector 72 in place without additional power. In various embodiments, charge leakage may require occasional refreshing of the charge.

In the exemplary embodiment, the force defined in Equation I is balanced with the linear spring force provided by the spring mechanism 82 according to the following Equation II:

$$F = k(d_0 - d),\qquad\text{Equation II}$$

where k is the linear spring constant; and $d_0$ is the initial value of the gap distance 78.

As discussed in the Background Section of this application, the range in which the forces of Equations I and II are in stable equilibrium occurs when the value, $(d_0-d)$ is between zero and $d_0/3$. At $(d_0-d) > d_0/3$, the electrostatic force of attraction of equation (1) overcomes the spring force of Equation II, such that the reflector 74 snaps to reflector 72, which is undesirable. This occurs because when the reflector 74 is beyond the $d_0/3$ position, excess charge is drawn onto reflectors 72 and 74 due to increased capacitance, which in turn increases the attractive force of Equation I between reflectors 72 and 74, causing reflector 74 to pull towards reflector 72.

However, the force between reflectors 72 and 74 of equation I can instead be written as a function of charge according to the following Equation III:

$$F = \frac{-Q^2}{2\varepsilon A},\qquad\text{Equation III}$$

where

Q is the charge on the capacitor.

With force F as a function of charge Q rather than distance d, it can be seen that the position of reflector 72 can be effectively controlled over the entire gap distance by controlling the amount of charge on reflectors 72 and 74.

Furthermore, micro-electromechanical device 70 has a mechanical time constant that causes delays in the movement of reflector 72 resulting from changes in charge Q on the variable capacitor. The mechanical time constant can be controlled by, among other things, the material used in spring mechanism 82 and by an environment in which micro-electromechanical device operates. For example, the mechanical time constant of micro-electromechanical device 70 will have one value when operating in an environment comprising air and another value when operating in an environment comprising helium.

Charge control circuit 32 utilizes each of these characteristics to control the gap distance over substantially the entire range. By applying a selectable control voltage to micro-electromechanical device 70 based on a duration of an enable signal, wherein the duration is less than device 70's mechanical time constant, the variable capacitance of device 70 appears to be "fixed" for the duration that the reference voltage is applied. As a result, the desired charge (Q) accumulated on the reflectors 72 and 74 from application of the selected reference voltage can be determined by Equation IV below:

$$Q = C_{INT} * V_{REF},\qquad\text{Equation IV}$$

where

VREF is the selected reference voltage; and $C_{INT}$ is the initial capacitance of micro-electromechanical device 70.

By keeping the duration of the enable signal (i.e., the electrical time constant) less than the mechanical time constant, the reference voltage is applied to micro-electromechanical device. 70 for a specific duration to deliver the desired charge and then removed. Once the reference voltage has been removed, micro-electromechanical device 70 is floating, or tri-stated, thus preventing additional charge from accumulating and enabling effective control of the gap distance for an increased control range relative to direct voltage control of micro-electromechanical device 70.

Although the description of the preceding paragraphs is with respect to an ideal parallel-plate capacitor and an ideal linear spring restoring force, those of ordinary skill within the art can appreciate that the principle described can be adapted to other micro-electromechanical devices 70, such as interference-based or diffraction-based display devices, parallel plate actuators, non-linear springs and other types of capacitors. With display devices, when the usable range is increased, more colors, saturation levels, and intensities can be achieved.

In one embodiment, micro-electromechanical device 70 is a parallel plate actuator 70. Parallel plate actuator 70 includes a flexure 80 in a spring mechanism 82. Spring mechanism 82 is adapted to support a first plate 72 and provide a restoring force to separate the first plate 72 from the second plate 74. Flexure 80 is attached to spring mechanism 82 and is adapted to support second plate 74. The spring mechanism 82 and flexure 80 maintain the first plate 72 in an approximately parallel orientation with respect to the second plate 74 at a deflection distance 78 or gap distance 78.

In one embodiment, micro-electromechanical device 70 is a passive pixel mechanism 70. The pixel mechanism 70 includes an electrostatically adjustable top reflector 72 and bottom reflector 74 which are configured to define a resonant optical cavity 76. Charge control circuit 32 is configured to select a visible wavelength of the passive pixel mechanism 70 by storing a charge having a desired magnitude on top reflector 72 and bottom reflector 74, to thereby control a gap distance 78.

Figure 3:
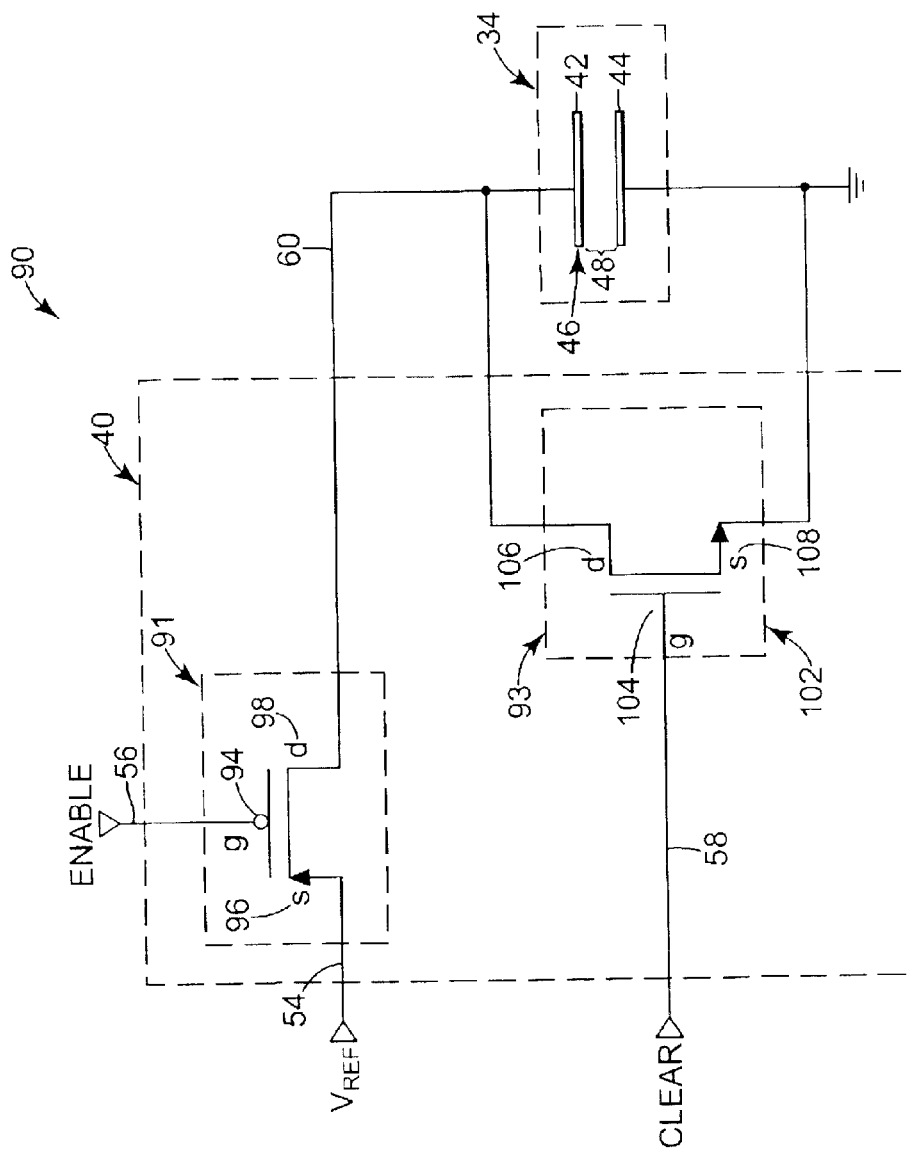
FIG. 3 is a schematic diagram illustrating an exemplary embodiment of a charge control circuit.

FIG. 3 illustrates schematically at 90 one embodiment of switch circuit 40 according to the present invention. Charge control circuit 32 includes a first switch 91 and a second switch 93. In one embodiment, first switch 91 is a —p-channel metal-oxide-semiconductor (PMOS) device having a gate 94, a source 96, and a drain 98. In one embodiment, second switch 93 is an n-channel metal-oxide-semiconductor (NMOS) device having a gate 104, a drain 106, and a source 108.

First switch 91 receives the selected reference voltage (VREF) at source 96 via path 54 and the enable signal at gate 94 via path 56. Drain 98 is coupled to first conductive plate 42 of micro-electromechanical device 34 via path 60. Second switch 93 is coupled across micro-electromechanical device 34 with drain 106 coupled to first conductive plate 42 and source 108 coupled to second conductive plate 44 via ground. Second switch 93 receives the clear signal at gate 104 via path 58.

Switch circuit 40 operates as described below to cause a charge having a desired magnitude to be stored on first and second conductive plates 42 and 44. Initially, the enable signal is at a "high" level, the clear signal is at a "low" level, and the reference voltage is at a selected voltage level. The clear signal is then changed from a"low" level to a "high" level, causing second switch 93 to turn on and take first conductive plate 42 to ground, thereby removing any charge that may have been stored on variable capacitor 46. The signal is then returned to the "low" level causing second switch 93 to again turn off.

The enable signal is then changed from the "high" level to a "low" level, causing first switch 91 to turn on to thereby apply the reference voltage to variable capacitor 46 and cause a desired charge to accumulate on first and second conductive plates 42 and 44, and thereby set the gap distance 48 to a desired distance. The enable signal stays "low" for a predetermined duration before returning to the "high" level causing first switch 91 to again turn off, decoupling the reference voltage from micro-electromechanical device 34. At this point, the micro-electromechanical device is tri-stated, or isolated, and charge can no longer flow. The predetermined duration is shorter than a mechanical time constant of micro-electromechanical device 34 resulting in the variable capacitor 46 appears to be substantially "fixed" during the predetermined duration so that the stored charge can be calculated using Equation IV. Thus, in one embodiment, the predetermined duration is a fixed value and the value of the reference voltage is varied to thereby control the magnitude of the charge stored on variable capacitor 46.

In one embodiment, switch circuit 40 does not include second switch 93 and does not receive the clear signal to first remove any stored charge from variable capacitor 46 prior to charging variable capacitor 46 to a desired magnitude. Thus, rather than charging variable capacitor 46 from a value of zero each time the variable gap distance is changed, the reference voltage is modified as required to transition from one gap distance to another gap distance. To transition to a smaller gap distance from a large gap distance, the reference voltage is increased to add charge to variable capacitor 46. To transition to a larger gap distance from a smaller gap distance, the reference voltage is decreased to thereby remove charge from variable capacitor 46.

Figure 4:
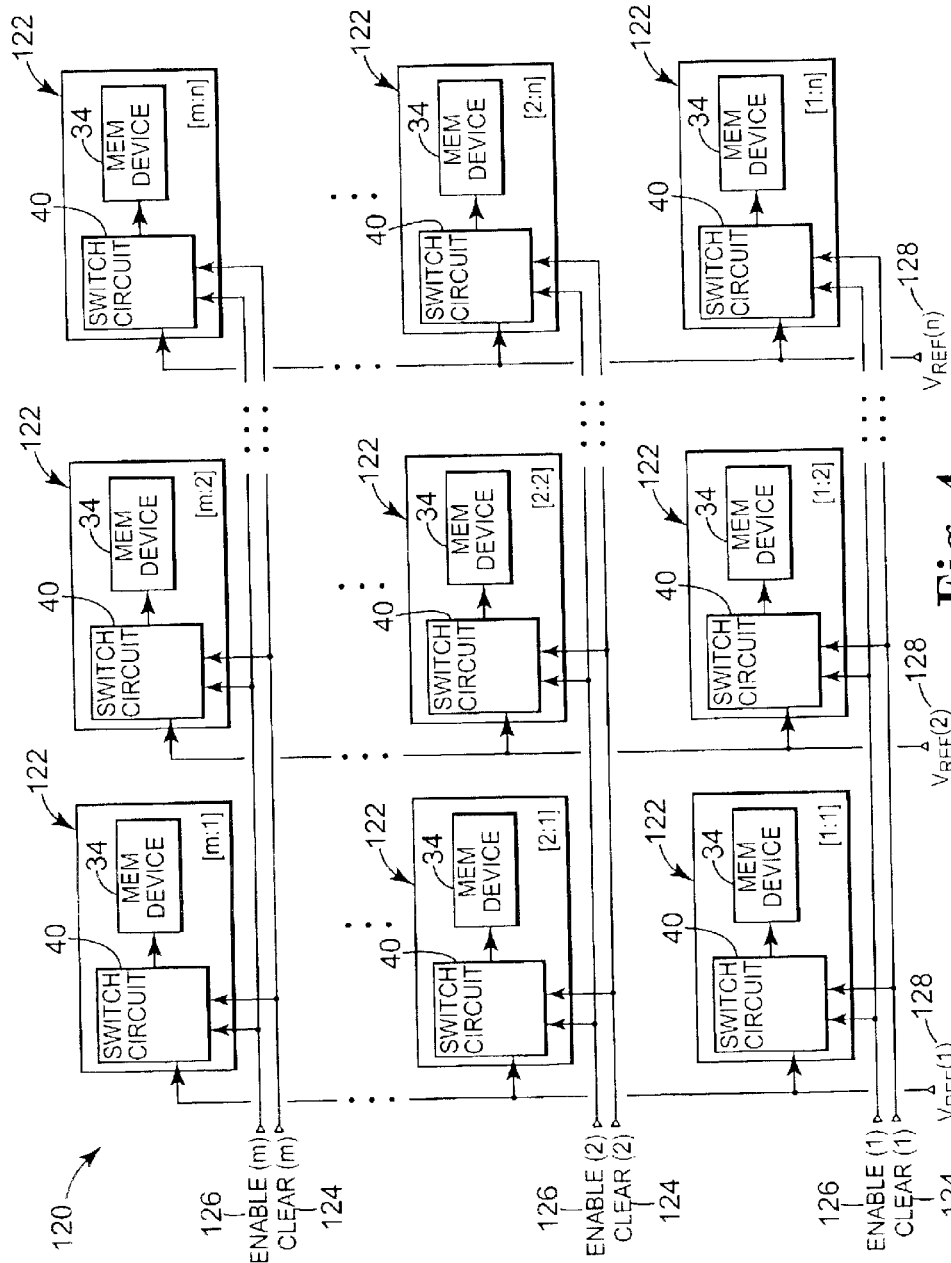
FIG. 4 is a diagram illustrating an exemplary embodiment of a micro-electromechanical system according to the present invention.

FIG. 4 is a block diagram illustrating an exemplary embodiment of a micro-electromechanical system 120 according to the present invention. Micro-electromechanical system 120 comprises an M-row by N-column array of micro-electromechanical (MEM) cells 122, with each cell 122 comprising a micro-electromechanical device 34 and switch circuit 40. Although not illustrated for simplicity, each mirco-electromechanical device 34 further comprises a first conductive plate 42 and a second conductive plate 44 forming a variable capacitor 46 separated by a variable gap distance 48.

Each switch circuit 40 is configured to control the magnitude of a stored charge on variable capacitor 46 of its associated micro-electromechanical device 34 to thereby control the associated variable gap distance 48. Each row of the M rows of the array receives a separate clear signal 124 and enable signal 126, for a total of M clear signals and M enable signals, with all switch circuits 40 of a given row receive the same clear and enable signals. Each column of the N columns of the array receives a separate reference voltage ($V_{REF}$) 128, for a total of N reference voltage signals.

To store, or "write", a desired charge to each micro-electromechanical device 32 of a given row of micro-electromechanical cells 122, a reference voltage having a selected value is provided to each of the N columns, with each of the N reference voltage signals potentially having a different selected value. The clear signal for the given row is then "pulsed" to cause each of the switch circuits 40 of the given row to remove, or clear, any potential stored charge from its associated micro-electro mechanical device 34. The enable signal for the given row is then "pulsed" to cause each switch circuit 40 of the given row to apply its associated reference voltage to its associated micro-electromechanical for the predetermined duration. As a result, a stored charge having a desired magnitude based on the value of the applied reference voltage is stored on the associated variable capacitor to thereby set the variable gap distance based on the desired magnitude of the stored charge. This procedure is repeated for each row of the array to "write" a desired charge to each micro-electromechanical cell of the array.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of controlling a micro-electromechanical system (MEMS) device having a variable capacitor defining a variable gap distance, comprising:

applying a reference voltage having a selected voltage level across the MEMS device for a duration at least as long as an electrical time constant of the MEMS device, but shorter than a mechanical time constant of the MEMS device, to cause a stored charge having a desired magnitude to accumulate on the variable capacitor, wherein the variable gap distance is a function of magnitude of the stored charge.

2. The method of claim 1, further comprising:

removing a stored charge on the variable capacitor prior to applying the reference voltage across the micro-electromechanical device.

3. A method of controlling a MEMS actuator having a pair of plates with a gap therebetween supported by a spring mechanism having a mechanical time constant, comprising:

applying a isolatable voltage to the pair of plates to select a desired gap size by having a reference voltage applied for a duration less than the mechanical time constant then removing the reference voltage after a desired charge has been applied to the pair of plates.

4. The method of claim 3, further comprising:

removing the desired charge accumulated between the first plate and the second plate.

5. A method of controlling a MEMS actuator having a first plate and a second plate with a restoring force applied to a gap therebetween, the second plate coupled to ground, comprising:

switching a reference voltage across the first plate and ground;

accumulating a desired charge on the first plate and second plate for a duration less than a mechanical time constant of the MEMS actuator; and decoupling the reference voltage from the first plate.

6. The method of claim 5, further comprising:

switching the first plate to ground to remove charge accumulated between the first plate and the second plate.

* * * * *